(No Model.) 4 Sheets—Sheet 1.
L. SCHOPPER.
GAGE FOR INDICATING THICKNESS OF PAPER, &c.
No. 535,224. Patented Mar. 5, 1895.
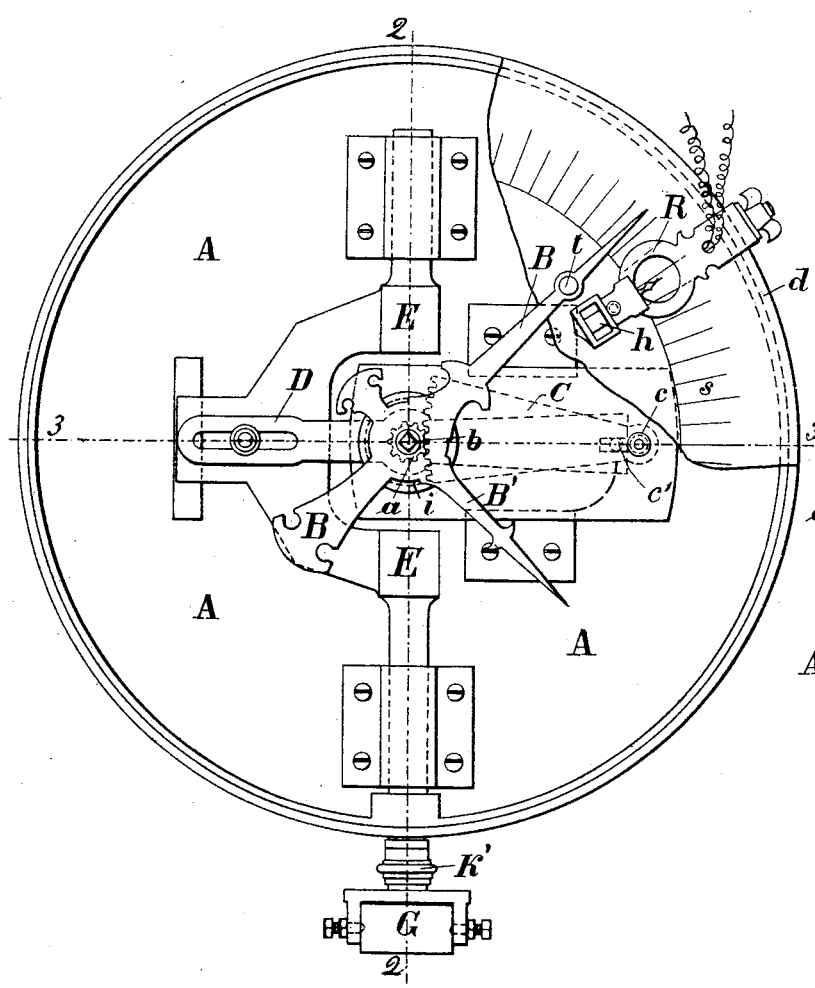
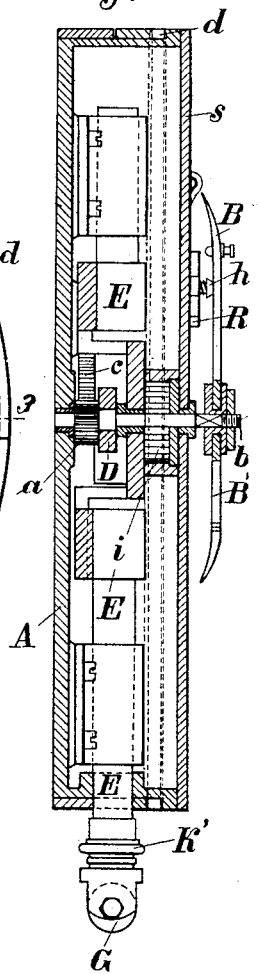
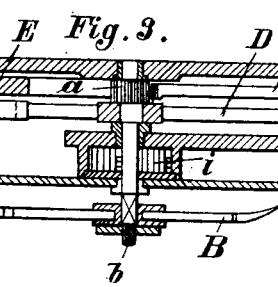
WITNESSES.
E. M. Clark
C. Sedgwick
INVENTOR:
L. Schopper
BY
Munn & Co.
ATTORNEYS (No Model.)    4 Sheets—Sheet 2.

L. SCHOPPER.

GAGE FOR INDICATING THICKNESS OF PAPER, &c.

No. 535,224.    Patented Mar. 5, 1895.

WITNESSES.
E M Clark
C Sedgwick

INVENTOR:
L. Schopper
BY
Munn & Co
ATTORNEYS (No Model.) 4 Sheets—Sheet 3.
L. SCHOPPER.
GAGE FOR INDICATING THICKNESS OF PAPER, &c.
No. 535,224. Patented Mar. 5, 1895.
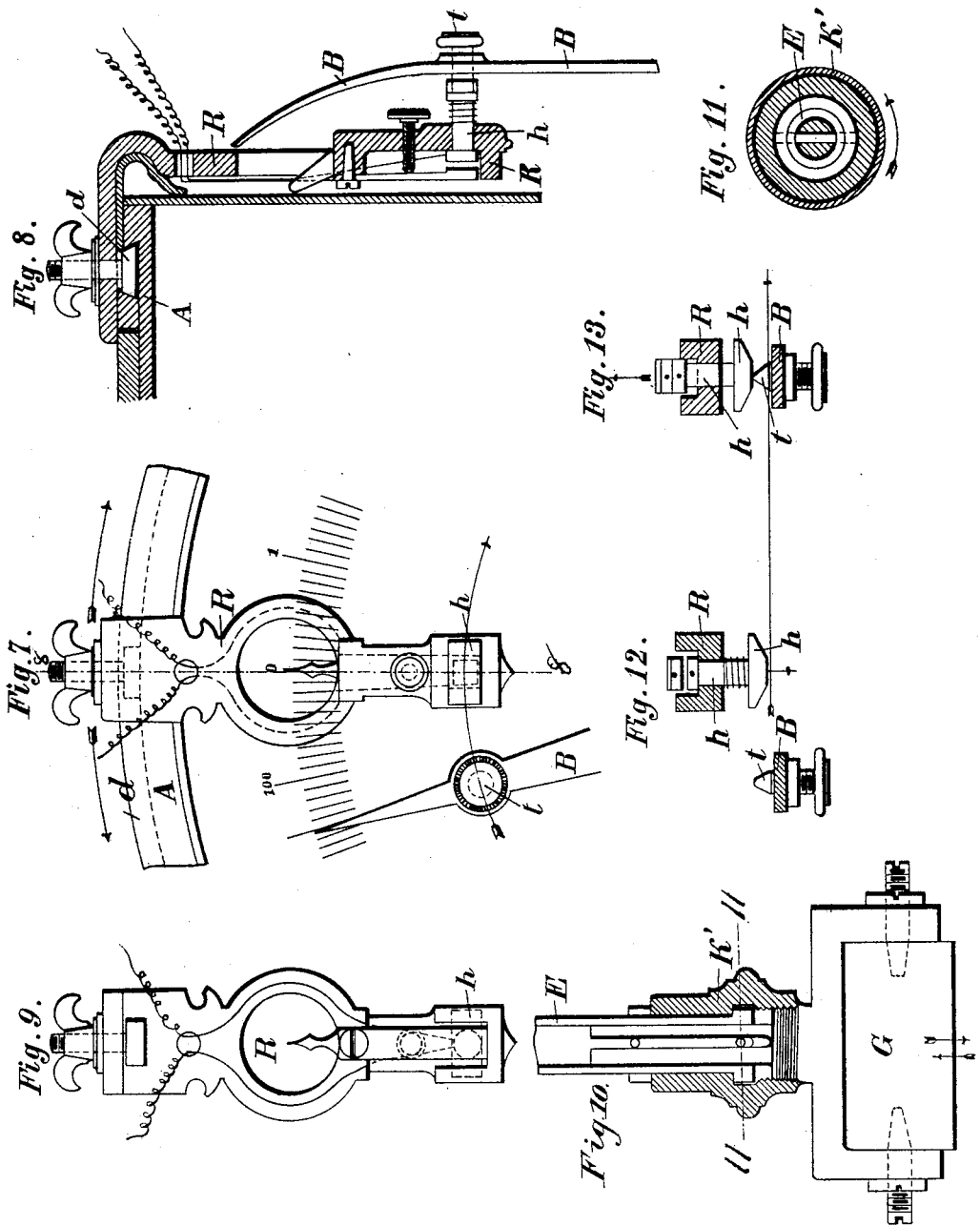
WITNESSES.
E. M. Clark
C. Sedgwick
INVENTOR:
L. Schopper
BY Munn & Co
ATTORNEYS.

(No Model.) 4 Sheets—Sheet 4.
L. SCHOPPER.
GAGE FOR INDICATING THICKNESS OF PAPER, &c.
No. 535,224. Patented Mar. 5, 1895.
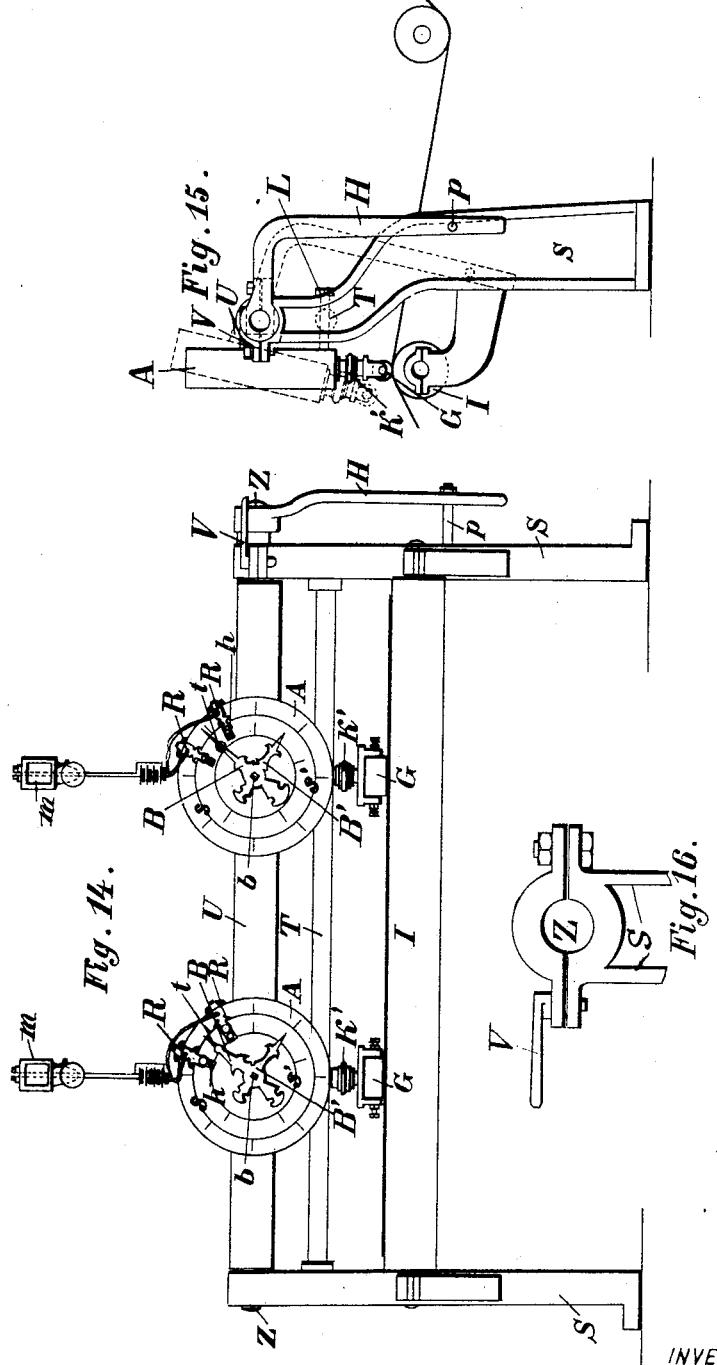
WITNESSES
E. M. Clark
C. Sedgwick
INVENTOR:
L. Schopper
BY
Munn & Co
ATTORNEYS

UNITED STATES PATENT OFFICE.

LOUIS SCHOPPER, OF LEIPSIC, GERMANY.

GAGE FOR INDICATING THICKNESS OF PAPER, &c.

SPECIFICATION forming part of Letters Patent No. 535,224, dated March 5, 1895.

Application filed July 13, 1893. Serial No. 480,379. (No model.)

*To all whom it may concern:*

Be it known that I, LOUIS SCHOPPER, of Leipsic, in the Kingdom of Saxony and German Empire, have invented new and useful Improvements in Gaging-Machines, of which the following is a specification, reference being had therein to the accompanying drawings.

The object of the present invention is to provide means for visibly indicating the thickness and weight of the paper produced by a paper making machine, and to transmit to various parts of the establishment where the machines fitted with said indicating device are in use, audible signals indicating that the thickness or weight of the paper has exceeded or fallen below the maximum or minimum limit.

This invention is represented in the accompanying drawings, wherein—

Figure 6:
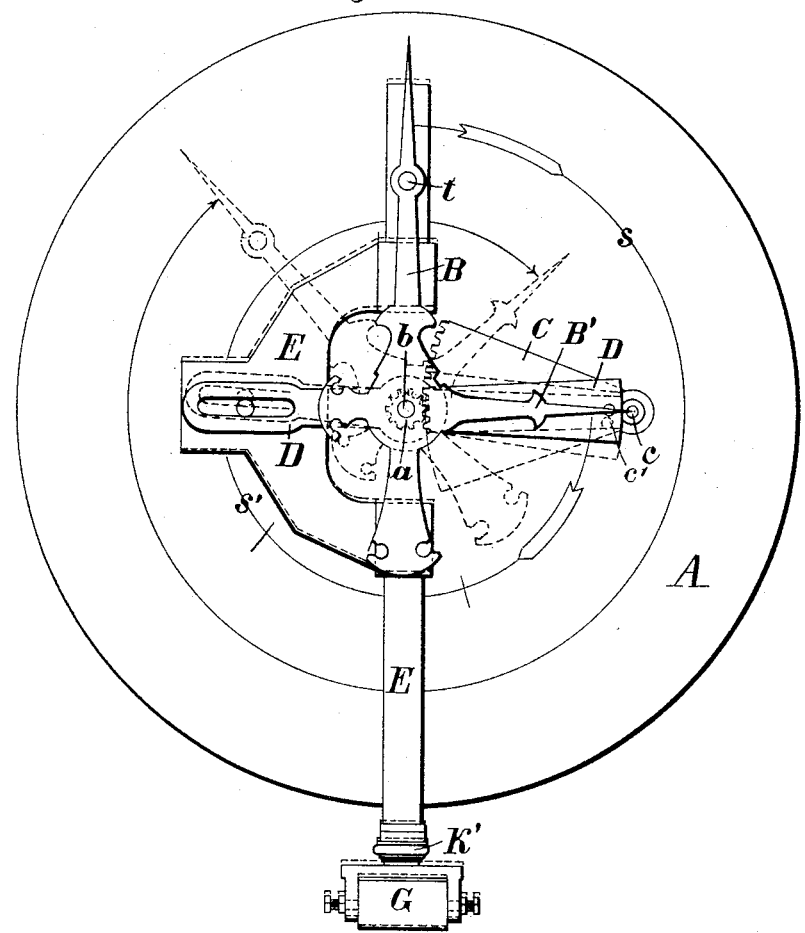
Figure 4:
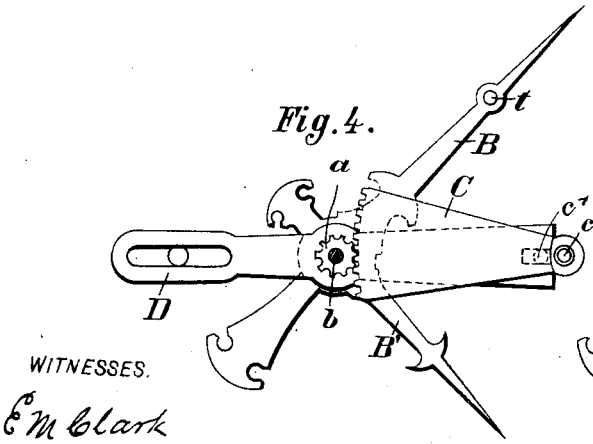
Figure 5:
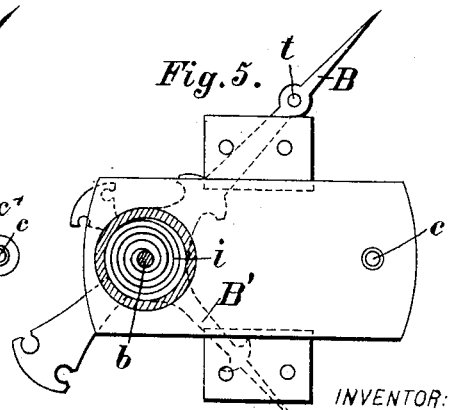

Figure 1 shows the indicating apparatus with the greater portion of the cover or dial broken away. Fig. 2 is a vertical section on the line 2—2, and Fig. 3 is a horizontal section on the line 3—3 in Fig. 1. Figs. 4 and 5 show details of construction of the hands and the parts connected therewith. Fig. 6 shows two different positions of the indicating hands and their connections. Fig. 7 is a detail view of the electric contact apparatus. Fig. 8 is a section on the line 8—8 in Fig. 7. Fig. 9 is a sectional view of the contact apparatus represented in Figs. 7 and 8 with parts removed. Fig. 10 is an enlarged vertical section showing the method of adjusting the indicator. Fig. 11 is a horizontal section on the line 11—11 in Fig. 10. Figs. 12 and 13 are detail views showing the position of the indicating hand B with reference to the electric contact piece R, when not inserted, and when inserted respectively. Fig. 14 is a front elevation of a gaging machine provided with two of these indicators; and Fig 15 is a side elevation of Fig. 14. Fig. 16 is a detail of the stopping apparatus of the V shaped iron V shown in Fig. 15.

The usual method in practice for ascertaining the thickness of the paper produced in the paper making machine is to take from time to time pieces of paper out of the machine to weigh them and to make from the difference in the weight a calculation as to the manner in which the machine is working. It is evident, that in this way the thickness and weight of the paper can only be ascertained with insufficient accuracy and in consequence the paper produced by the machine is often imperfect.

The present invention relates to an improvement which does away with the above disadvantage. It consists of one or more indicating devices which are arranged on a roller over which passes the paper produced in the paper machine, said indicating devices being constructed so as to show at any time on a scale the thickness of the paper passing over the said roller and the weight per square meter or any other size; so that at one glance the attendant can always make sure of any alteration in the paper arising therefrom. In addition to this the indicating devices are preferably provided with an electric contact apparatus, which indicates that the allowed difference in the thickness has been exceeded by closing an electric circuit to operate a pair of bells connected with it, which bells may be located in different rooms of the factory or in the office, so that when one of the bells begins to ring, this indicates that the thickness of the paper has exceeded one of the fixed limits and the machine should be regulated.

The mechanism for operating the indicating hand B, is contained in a box A, which is closed in front by a pane of glass on which the scale is marked. The indicating hand B, is made in one piece with the smaller hand B', which is at right angles to the former, and is fast on an axis $b$. While the hand B, shows on the scale $s$ the thickness of the paper, the hand B' shows on a second scale $s'$ the weight of the paper. Fast on the axis $b$ is a small toothed wheel $a$ which gears with a toothed sector C pivoted at $c$. This toothed sector is pivotally connected by means of a pin $c'$, working in a slot to a lever D, loose on the spindle $b$ on which it turns as a fulcrum. At the other end of the lever D, *i. e.*, opposite to the turning point $c$ of the toothed sector C the lever D is adjustably connected by means of a pin and slot to the pressing rails E. Through the medium of the adjusting screw K' as shown in Figs. 10 and 11 these pressing rails E are connected to a frame which carries the support of a pressing roller G. Between this movable roller G and the roller I whose bearings are stationary the paper, the thickness of which is to be measured, is pressed. The hands are returned toward the zero position when the thickness of the paper is decreasing, by the spiral spring $i$ surrounding the axis $b$. Fig. 6 shows the position of the hands B and B', the lever D and guide rails E through the raising of the roller G.

In order to obtain paper of as uniform a thickness as possible, it is preferable to provide a sounding apparatus which will operate automatically when the deviation from the normal thickness exceeds a certain limit. In order to audibly indicate such deviations or differences the box A is surrounded by a groove $d$ along which contact holdfasts R can be moved and fixed by means of screws and winged nuts.

The indicating hand B has a screw $t$ (see Figs. 7 and 8) which presses down a spring controlled contact stud $h$ connected to the holdfast R as soon as the hand comes to the place where this holdfast is located, whereby the electric circuit is closed to operate the bells $m$ Fig. 14.

If it is required that the thickness of the paper should range between a maximum and minimum limit, two holdfasts of this kind are necessary and when the hand rises or falls either the one or the other contact is made to close the circuit. The bells are thereby actuated and for each holdfast separate circuits and bells of different sounds may be provided so that one can tell from the sound in which direction the machine should be regulated.

The box A of the apparatus is preferably located at the upper part of the machine and fastened with screws to a V shaped iron U and can be turned between the pillars S S on pivots Z. Underneath this V shaped iron, a second bar T is provided between the pillars, which said bar T serves for the reception of the screws L. The points of these screws serve as supports for the apparatus and by means of the same the apparatus is brought into a nearly vertical position.

In Fig. 14 an apparatus is represented with two contact holdfasts in connection with the bells. In order to raise the indicating devices so as to introduce the paper between the roller I and the pressing roller G, a lever H has been fixed to the pivot Z. This lever extends nearly vertically downward and carries a peg $p$ which works in the V-shaped recess of the frame S. When the apparatus is fixed the peg strikes against one of the legs of the frame S and to avoid the removing of the apparatus, one support on the right hand side of Fig. 14 is arranged, in such manner that by loosening of the screw V which is provided with a lever arm for this purpose, the raising of the horizontal iron U can be effected and after the regulation, the screw is fastened again and the V shaped horizontal iron U is prevented from turning. To pass the paper between the rollers G and I, the screw is loosened, the lever H is drawn to the front till the peg $p$ strikes against the front leg of the pillar S and the indicating device assumes the position indicated by the dotted lines in Fig. 15. When the parts are in this position the paper is pulled through, the screw is now tightened and the whole apparatus is brought into the normal position.

Before inserting the paper, the adjusting screw K' is turned, if necessary, till the indicating hand B points at zero on the scale $s$. As soon as the paper gets between the rollers G and I, the rails E are raised, the lever D is given a swinging movement around the spindle $b$, the toothed sector C turns around its pivot $c$ and thereby rotates the pinion $a$ on the spindle $b$ with the hands B and B', which indicate, on the scales $s$ and $s'$ respectively, the thickness and the weight of the paper. Owing to the particular construction of the mechanism for rotating the spindle $b$, a very slight vertical displacement of the rails E will cause a comparatively considerable movement of the hand B, so that the graduations of the scale $s$ may indicate thousandths of a millimeter.

The operation of the electric contact and signaling apparatus will be obvious without further explanation.

Having now particularly described and ascertained the nature of my said invention and in what manner the same is to be performed, I declare that what I claim is—

1. In a gaging machine, the combination with a guide roller over the circumference of which the paper is adapted to travel, of a contact roller adapted to normally bear upon the paper where it is in contact with the said guide roller, rails capable of a sliding movement toward and from the said guide roller, a connection between the contact roller and the said rails, an indicating hand constructed to turn on a pivot, a pinion rigidly connected therewith, a toothed sector engaging with the pinion and pivoted to the casing of the apparatus, and a lever loosely mounted on the spindle of the hand and extending on both sides thereof, one end of the said lever having a pivotal and sliding engagement with the toothed sector, and the other end of the lever being connected in a like manner with the said sliding rails, substantially as and for the purpose set forth.

2. A paper making machine, provided with a movable device constructed to be held in contact with the paper and follow the variations in the thickness of the same, an indicating hand provided with a projection and connected with the said device, an adjustable hold-fast secured to the frame of the apparatus, a contact stud yieldingly attached to the said hold-fast in the path of travel of the said projection and adapted to make an electric contact when operated by the said projection, an electric circuit adapted to be closed by the said contact stud, and an electric bell included in the said circuit, substantially as and for the purpose set forth.

3. In a gaging machine, the combination with vertically movable pressing rails, of a hand fast on its axis, a pinion on said axis, a pivoted toothed sector engaging the pinion, and a lever fulcrumed on the axis of the hand and having one end connected to the sector and its other to the rails, substantially as described.

4. In a gaging machine, the combination with vertically movable pressing rails, of a spindle, a hand secured to the spindle, a pinion on the said spindle, a pivoted toothed sector engaging the pinion, and a lever fulcrumed on the spindle and having its ends connected with the toothed sector and pressing rails by a pin and slot connection, substantially as described.

In witness whereof I have hereunto set my hand in presence of two witnesses.

LOUIS SCHOPPER.

Witnesses:
    HERM. FINDEL,
    CARL BORNGRAEBER.